(12) United States Patent
Quinn et al.

(10) Patent No.: US 6,677,906 B2
(45) Date of Patent: Jan. 13, 2004

(54) GLASS ANTENNA FOR LAPTOP COMPUTERS

(75) Inventors: Liam B. Quinn, Austin, TX (US); James A. Brewer, Leander, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 10/124,469

(22) Filed: Apr. 17, 2002

(65) Prior Publication Data

US 2003/0197648 A1 Oct. 23, 2003

(51) Int. Cl.⁷ .................................................. H05K 5/00
(52) U.S. Cl. .................... 343/702; 361/752; 455/90; 343/700 MS
(58) Field of Search ........................ 343/702, 700 MC, 343/767, 769; 361/752, 800, 756; 174/255

(56) References Cited

U.S. PATENT DOCUMENTS

| | | | |
|---|---|---|---|
| 4,238,799 A | 12/1980 | Parfitt | 343/715 |
| 4,266,227 A | 5/1981 | Blaese | 343/715 |
| 5,138,328 A | 8/1992 | Zibrik et al. | 343/702 |
| 5,677,698 A | 10/1997 | Snowdon | 343/770 |
| 5,872,542 A * | 2/1999 | Simons et al. | 343/700 MS |
| 6,011,519 A | 1/2000 | Sadler et al. | 343/742 |
| 6,339,400 B1 | 1/2002 | Flint et al. | 343/702 |
| 6,342,858 B1 | 1/2002 | Dakeya et al. | 343/702 |
| 6,456,499 B1 * | 9/2002 | Nakajima et al. | 361/752 |
| 6,538,606 B2 | 3/2003 | Quinn et al. | 343/702 |

* cited by examiner

Primary Examiner—James Clinger
(74) Attorney, Agent, or Firm—Haynes and Boone, LLP

(57) ABSTRACT

A portable computer includes a base and a top movably mounted on the base. A non-conductive transparent display layer is mounted in the top and includes a channel formed therein that contains layers of transparent conductive and transparent non-conductive materials. A cable is connected to the base. A cable extension is coupled to and extends from the cable. The cable extension is imbedded in the channel. An antenna is coupled to the cable extension and is imbedded in the channel.

24 Claims, 4 Drawing Sheets

GLASS ANTENNA FOR LAPTOP COMPUTERS

BACKGROUND

The disclosures herein relate generally to computer systems and more particularly to a glass antenna for use in a laptop computer.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

More mobile computers are becoming wireless with the expansion of wireless Local Area Networks (WLAN), Personal Area Networks (PAN), and Wide Area Networks (WWAN). Wireless systems use a digital protocol to talk to a radio, which then broadcasts or receives computer data or images using an antenna. As in all radio technologies, both the antenna type and its' placement are critical to the performance of the radio. Some current laptops place the antenna in the base of the laptop. This can lead to problems with the antenna's radiated field.

When typing, users move their hands around the antenna. This provides a capacitive coupling which can drain energy from the antenna. Any antenna energy coupled to a user is not used to communicate with an access point. Therefore, communication performance is degraded.

When users put the laptop computer on their lap, an antenna placed in the base can capacitively couple to the user's legs. Again, this drains energy from the antenna, degrading the communications performance.

Antennas that extend out of the unit can break as the unit is being transported. If the antenna is supposed to be recessed into the laptop prior to moving, it becomes a nuisance for users to extend and retract the antenna whenever they move their location.

Metal structures in the base unit (drives, key springs, circuit board patterns, etc.) can negatively influence the radiated pattern.

Sometimes it is necessary to separate two antennas as far apart as possible. This is called diversity. The purpose of diversity is to receive a better signal. A diversity algorithm will periodically look at the received signal from both antennas and choose the antenna with the strongest signal. The base unit of the laptop is packed and separating the antennas can sometimes be difficult, because space is at a premium.

One manufacturer reportedly uses an antenna in the display housing. This enables the use of larger dipole antennas but it will be an additional step (or cost) to place the unit in the display housing at final assembly.

Another manufacturer has a slot in the back side of the display. The antenna for the wireless cards is imbedded in the module that plugs into the MultiPort slot. This solution is readily configurable, but modularity brings higher cost. This solution also provides a limited area for the antenna placement and diversity (the ability for one of two separated antennas to provide a substantially better received signal.

Finally, it is well known that automobiles sometimes have the AM/FM radio antenna imbedded into the windshield.

Therefore, what is needed is a laptop having an antenna installed within the display glass. Laptop array displays have a layer of glass over them to protect the array surface. An antenna that is imbedded on or within the covering glass has a large surface area in which to place the antenna structure, as long as the conductors used are not visible to the laptop user. This allows both a larger area to implement an antenna structure as well as the spatial separation to provide antenna diversity.

SUMMARY

One embodiment, accordingly, provides an antenna in the laptop display glass. To this end, a portable computer includes a base and a top mounted in the base. A non-conductive transparent display layer is mounted in the top and includes a channel formed therein that contains layers of transparent conductive and transparent non-conductive materials. A cable is connected to the base. A cable extension is coupled to and extends from the cable. The cable extension is imbedded in the channel. An antenna is coupled to the cable extension and is imbedded in the channel.

A principal advantage of these embodiments is that a range of different antennas can be placed in the display glass during manufacture of the laptop.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
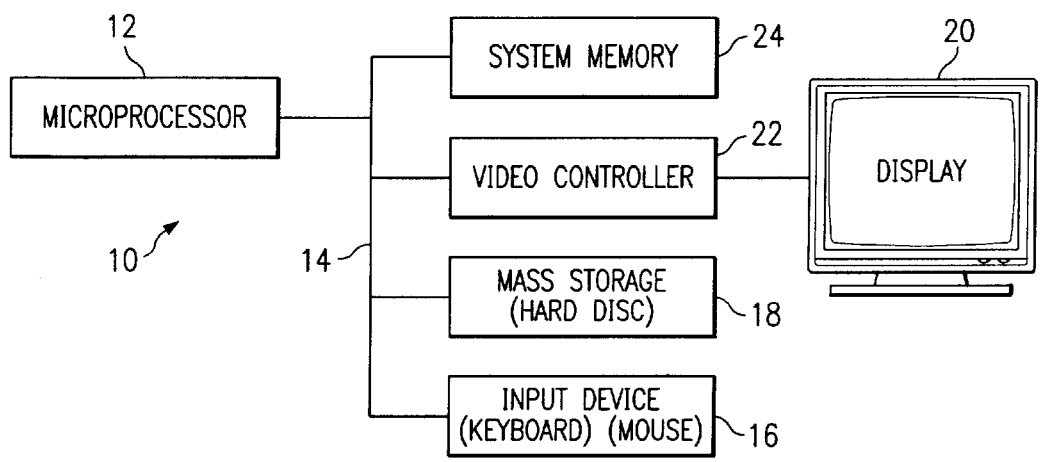
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
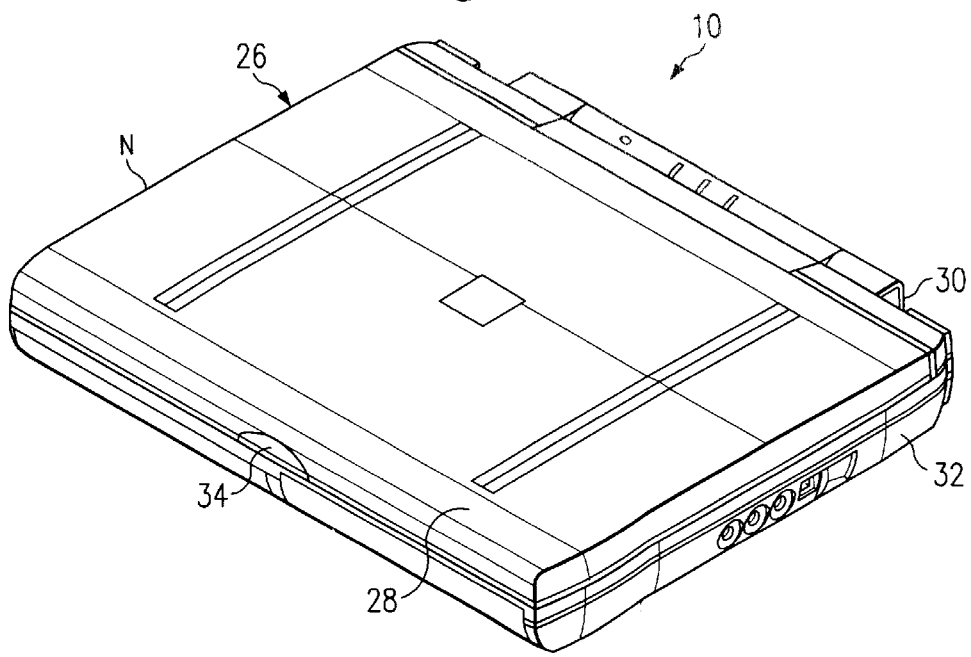
FIG. 2 is a perspective view illustrating an embodiment of a portable laptop computer having a lid in a closed position.
Figure 3:
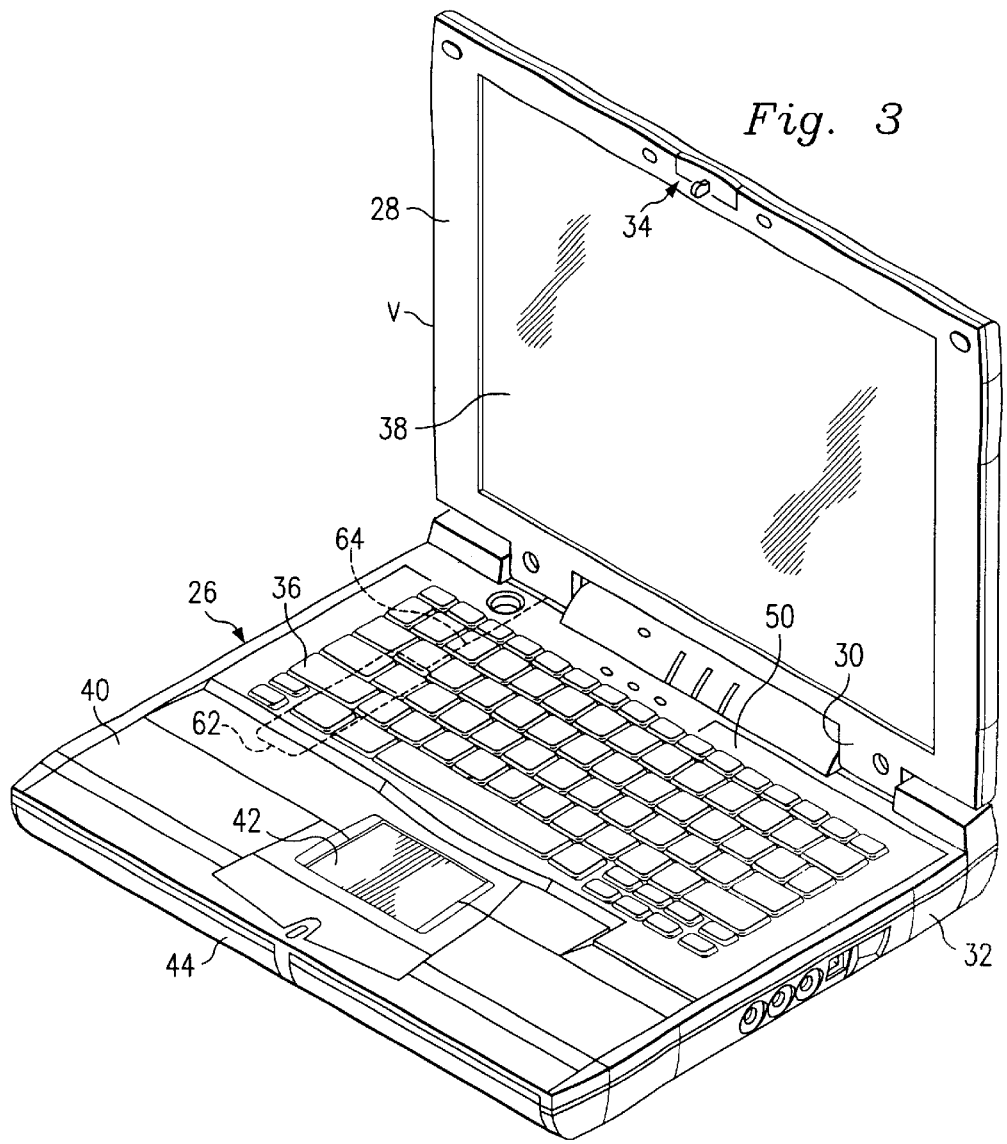
FIG. 3 is a perspective view illustrating an embodiment of a portable laptop computer having the lid in an open position.

Referring to FIG. 2, illustrated is a portable, notebook size computer designated 26 comprising a self-contained system, such as that illustrated at 10 in FIG. 1, and including a hinged top or lid 28 rotatable about a hinge or hinges 30 from a nested position, "N" with a horizontal chassis base 32, to a substantially vertical or open position "V," FIG. 3. Opening of the notebook style portable computer by manipulation of a latch 34, reveals a plurality of input components such as a keyboard of keys 36 on base 32, and a monitor screen 38 mounted in lid or top 28. Base 32 includes a palm or wrist rest area 40 including an input area 42 of the input system 16 positioned above a battery housing 44 and adjacent keys 36. Base 32 includes an exterior surface 50. The keyboard keys 36 and also the adjacent palmrest area 40 are provided on the exterior surface 50.

Figure 4:
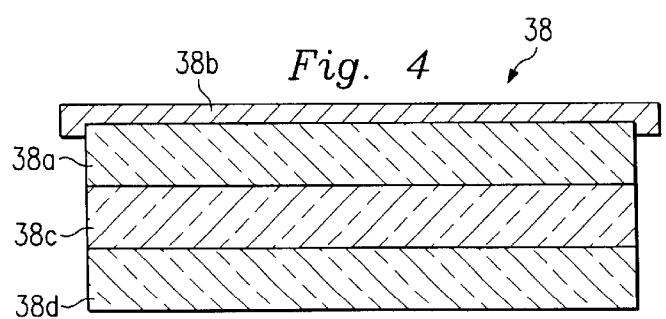
FIG. 4 is a diagrammatic cross-sectional view illustrating an embodiment of a computer screen.

The monitor screen 38, FIG. 4 comprises multiple layers including an LCD (Liquid Crystal Display) array layer 38a supported by a metal support 38b, a non-conductive protective glass layer 38c adjacent the array 38a and a non-conductive glass polarizer 38d adjacent the protective glass layer.

Figure 5:
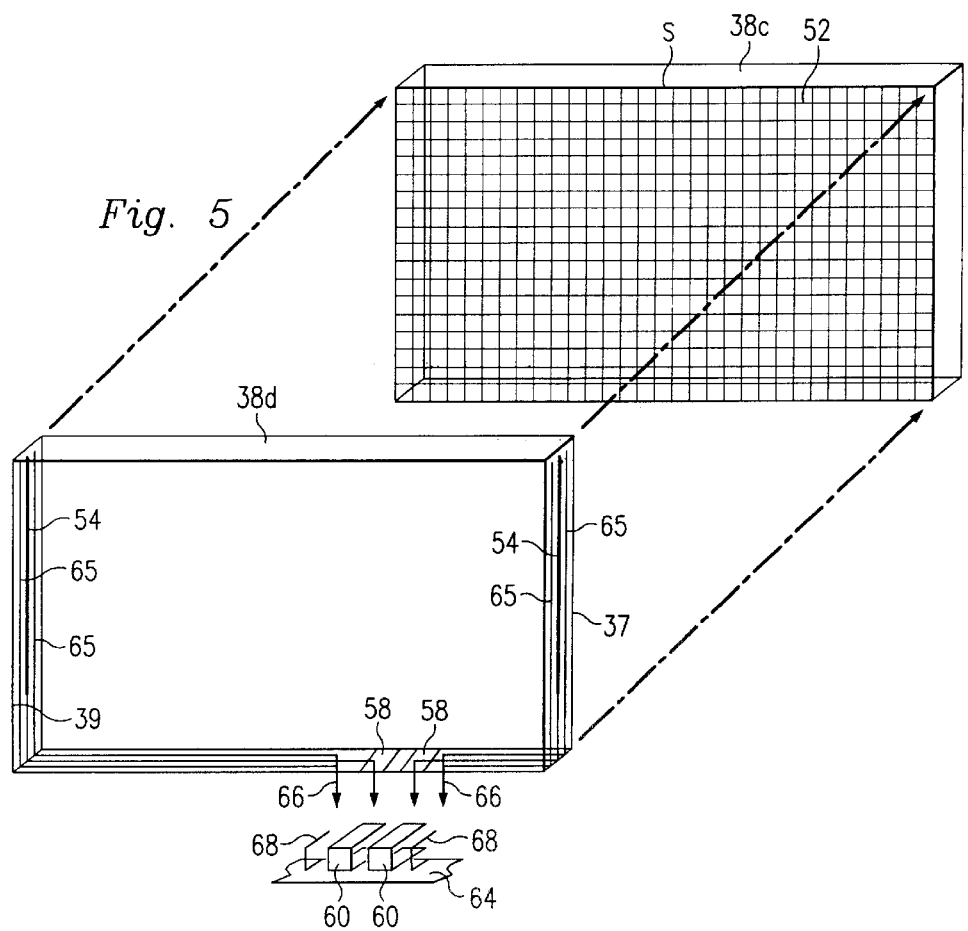
FIG. 5 is an exploded perspective view illustrating an embodiment of some of the layers of the computer screen.

In a preferred embodiment, FIG. 5, the protective glass layer 38c includes a ground reference plane 52 and the polarizer 38d includes a dipole antenna 54. The ground reference plane 52 is formed of a transparent conductive silica based material or a thin film such as indium tin oxide, preferably coated on all or a portion of the glass layer 38c on a surface S which abuts the polarizer 38d. The ground reference plane 52 could also be etched into the glass layer 38c using techniques similar to those used to make integrated circuits, however, this may not be as economically feasible as a coating. Also, the ground reference plane 52 would have a ground connection (not shown) extending beyond the edge of the glass and connecting to a stable ground within the system.

Figure 6:
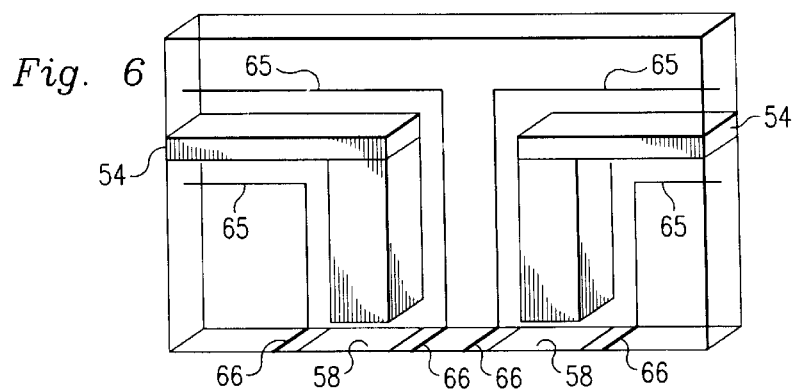
FIG. 6 is a perspective view illustrating an embodiment of one of the layers of the computer screen.

The antenna 54 can be imbedded in opposite edges 37, 39 of the polarizer 38d, or can be imbedded so as to extend through an interior portion 56 of polarizer 38d, see FIG. 6. Each portion of antenna 54 is formed of a transparent conductive polysilicon or silicon dioxide material or thin film and is joined to a connector or metal strap 58 which is provided to make connection with another connector 60. Each connector 60 connects to a radio transmitter and receiver 62 in the form of a mini-PCI card, mounted in base 32, by means of a coax cable 64, see also FIG. 3.

Returning to FIGS. 5 and 6, each portion of antenna 54 also includes a cable extension such as a ground trace 65 which is formed of a transparent conductive material and is connected to a connector 66 which is provided to make connection with another connector 68. Each connector 68 also connects to the coax cable 64. Preferably and prior to the location of the implemented antenna 54, a pair of ground traces 65 are spaced apart from their respective portion of antenna 54 by a portion of the non-conductive material in the polarizer 38d. This serves as electrical isolation and serves a similar purpose with respect to protecting the signal from noise as does the coax cable 64.

Although it is preferred to form the antenna 54 and the ground traces 65 of a transparent conductive material, it would not necessarily be required in the embodiment of FIG. 5, because the antenna 54 and ground traces 65 are along the edges 37, 39 of the polarizer 38d and therefore not in a field of view of the array 38a. However, it is preferred in each embodiment, to have the antenna 54 and ground traces 65 formed of the transparent conductive material, either a silica based material or a conductive thin film.

Figure 7:
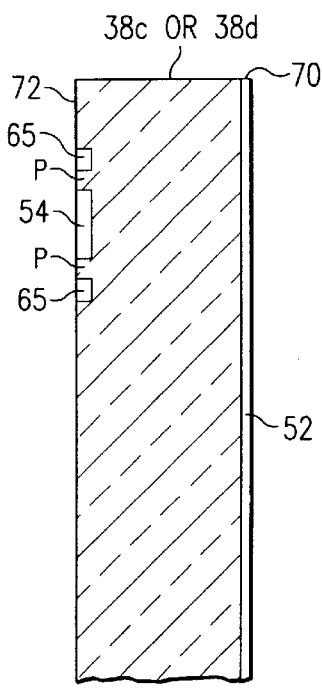
FIG. 7 is a diagrammatic cross-sectional view illustrating another embodiment of a portion of a layer of the computer screen.

In another embodiment, FIG. 7, polarizer layer 38d or glass layer 38c may be provided with the ground reference plane 52 on one surface 70 and the antenna 54 and associated ground traces 65 on an opposite surface 72. The ground traces 65 are spaced apart from the antenna 54 by a portion P of the non-conductive material. In addition, it may be desired to place an antenna as described above in a desktop computer or a flat panel display, not shown.

Figure 8C:
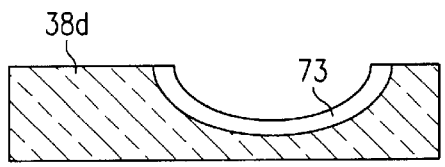
FIGS. 8a–8g are diagrammatic cross-sectional views illustrating yet another embodiment of a portion of a layer of the computer screen.
Figure 8D:
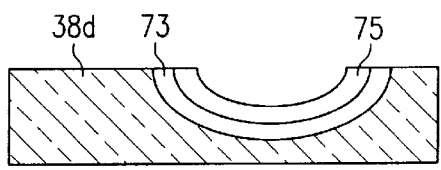
Figure 8E:
Figure 8F:
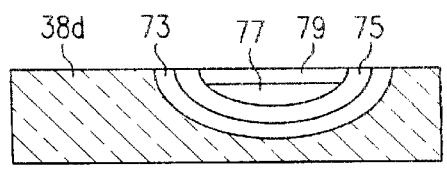
Figure 8A:
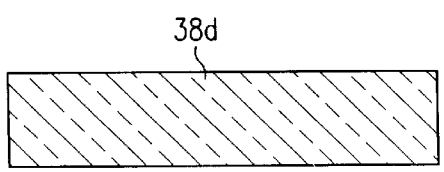
Figure 8G:
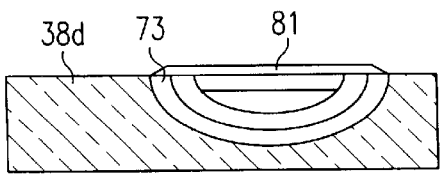
Figure 8B:

FIGS. 8a to 8g show another embodiment. This technique has the advantage of totally encapsulating the antenna signal, in effect, creating a glass coax implementation which closely compares to the typical copper coax wire implementation used to get signals to an antenna. FIG. 8a shows a view of non-conductive layer 38d as would be the case before any signals are inserted. FIG. 8b shows that a channel 71 has been etched into the layer 38d. The channel 71 would extend from the edge of the layer 38d where contacts will be placed and where it will connect to wires extending from the radio transmitter and receiver 62. The channel 71 extends through the layer 38d to the position where the antenna 54 will be placed. FIG. 8c illustrates what the channel looks like after a transparent conductive shield or ground layer 73 is placed along the bottom and sides of the channel 71. The layer 73 makes up the antenna signal shield and will be totally connected at the end of the process to form a total shield around the antenna signal line. FIG. 8d demonstrates what the layer 38d looks like after a transparent non-conductive layer 75 has been placed on the shield layer 73. Like the shield layer 73, this non-conductive layer 75 will totally encapsulate the signal layer discussed below. The purpose of the layer 75 is to insulate the conductive ground or shield 73 from a conductive antenna signal layer 77, which is shown after it is formed in FIG. 8e. FIG. 8f shows a non-conductive shield layer 79 similar to layer 75, placed to encapsulate antenna signal layer 77. Along with the shield layer 75, the shield layer 79 totally encloses the signal layer 77. The last step in the process is to connect the ground layer 73 with a conductive layer 81 to enclose the antenna signal layer 77. Once this process is complete and layers 73 and 81 are in place, the antenna signal layer 77 cannot radiate electromagnetic energy and serves the same purpose as would a coax antenna cable. All the layers inserted, whether conductive or non-conductive, are transparent and do not impede a users view of their LCD screen.

The antenna 54 would be implemented in a similar manner to the glass coax shown in FIG. 8g but with the entire channel being filled with a transparent conductive material connected to antenna signal layer 77. The ground or shield 73, 81 would terminate about 1 to 5 mm prior to where the antenna begins, to insure that the shield and signal are kept separate. The antenna 54 would be formed in a pattern specific to the type of waveform and frequency that needs to be radiated and follows a pattern etched into the glass.

In either of the embodiments shown however, the antenna 54 and ground traces 65 are imbedded in a host layer to protect against damage due to abrasive wear. The traces 65 may be protected by using a polarized sheet of glass, which is typically used in LCD display technology, to completely cover the antenna and/or ground traces.

In operation, there are several considerations for implementing the disclosed embodiments.

If a visible wire antenna is large enough to see, then it can be placed toward the edge area of the glass. This can be the area that is covered by the bezel. Alternatively, the wire can be on the side or cut edge of the glass. Conductors may be placed either on the glass surface or molded into the glass.

If the wire antenna is thin enough that it can't be seen by the user, then the antenna can be placed across the glass surface over the display's viewable area. These conductors can be imbedded on or within the glass surface, but it is best not to place wires on the external surface where they may be rubbed off by the user (i.e., cleaning the display or vibration chaffing between two pieces of glass).

The wire antenna, as discussed above, may be made of a transparent conductive polysilicon, silicon dioxide compound or thin film which may be doped or sputtered into the glass via processes such as Physical Vapor Deposition (PVD). Prior to the doping, the wire position will be etched out of the glass. This may be performed using techniques similar to standard silicon wafer etching. Once the etching is accomplished, the wire may be doped into the glass and it then becomes a part of the glass. This insures the antennas robustness and minimizes any interference with the display from the antenna that a user might detect.

The antenna and coax may be made of transparent conductive and/or non-conductive materials as shown in FIGS. 7 and 8a–8g, or they may be made from transparent conductive thin-films that are placed on the surface of the glass.

When placing the antenna into or onto the display glass, it is important to insure that the "glass" antenna makes good contact with the radio wires or circuitry. This is done by bringing the antenna signal and ground shield feed points to the glass surface or edge where they can be contacted by conductive spring brushes or clips. The connecting spring brush or clip presses against the antenna feed point in or on the glass and insures good contact. If good electrical contact is not guaranteed at this point, the antenna will be mismatched to the radio and transmit/receive performance will be degraded.

As can be seen, the principal advantages of these embodiments are that a range of different antennas can be placed in the display glass during manufacture of the laptop. Depending on the type of wireless desired by the customer, different antennas may be activated to satisfy different wireless modes (WPAN, WLAN, or WWAN). These antennas may be placed far enough apart on/in the display to insure minimum coupling and maximum performance.

All laptops may be wireless enabled by always imbedding the antenna. For a laptop to become wireless, manufacturing (or the customer) simply plugs in the appropriate radio which then automatically selects the correct antenna for the selected desired comm mode.

The antenna has the potential to be manufactured as a part of the glass. This eliminates the time and cost of incorporating an antenna into the box at final assembly.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A portable computer comprising:
   a base;
   a top movably mounted on the base;
   a non-conductive transparent display layer mounted in the top including a channel formed therein that contains layers of transparent conductive and transparent non-conductive materials;
   a cable connected to the base;
   a cable extension coupled to and extending from the cable, the cable extension imbedded in the channel; and
   an antenna coupled to the cable extension and imbedded in the channel.

2. The computer as defined in claim 1 wherein the antenna extends through the display layer.

3. The computer as defined in claim 2 wherein the display layer has opposed edges and the antenna is imbedded into the edges.

4. The computer as defined in claim 3 wherein the antenna is formed of a transparent conductive material.

5. The computer as defined in claim 1 wherein the display layer has opposed surfaces and the antenna is imbedded into a first one of the surfaces and a ground plane is provided on a second one of the surfaces opposite the first surface.

6. The computer as defined in claim 1 wherein the display layer is formed of non-conductive material, and the cable extension and antenna are spaced apart by the non-conductive material.

7. The computer as defined in claim 1 further comprising:
   a connector between the top and the base, the connector connecting the cable and the cable extension.

8. A computer system comprising:
   a computer chassis including a base and a top movably mounted on the base;
   a microprocessor mounted in the chassis;
   a mass storage coupled to the microprocessor;

a video controller coupled to the microprocessor;

a non-conductive transparent display layer including a channel formed therein;

a cable extension formed of conductive silica material imbedded in the channel; and an antenna formed of conductive silica material imbedded in the channel and separated from the cable extension by the display layer.

9. The system as defined in claim 8 wherein the display layer is adjacent an array layer.

10. The system as defined in claim 9 wherein the cable extension includes ground traces.

11. The system as defined in claim 10 wherein the traces and the antenna are separated by a portion of the non-conductive display layer.

12. The system as defined in claim 11 wherein the display layer has opposed edges and the traces and the antenna are imbedded into the edges.

13. The system as defined in claim 11 wherein the traces and the antenna extend through the display layer.

14. The system as defined in claim 11 wherein the display layer has opposed surfaces and the antenna and traces are imbedded into a first one of the surfaces and a ground plane is provided on a second one of the surfaces opposite the first surface.

15. A method of mounting an antenna in a portable computer comprising:

providing a base;

movably mounting a top on the base;

mounting a transparent display layer in the top including a channel formed therein;

connecting a cable to the base;

imbedding a conductive cable extension in the channel and coupling the cable extension to the cable; and imbedding a conductive antenna in the channel and coupling the antenna to the cable extension.

16. The method as defined in claim 15 further comprising:

providing an array layer, the display layer being adjacent the array layer.

17. The method as defined in claim 16 further comprising:

providing the cable extension to include conductive ground traces adjacent the antenna.

18. The method as defined in claim 17 further comprising:

separating the antenna and the ground traces by a portion of the non-conductive display layer.

19. The method as defined in claim 18 further comprising:

imbedding the traces and the antenna in opposed edges of the display layer.

20. The method as defined in claim 18 further comprising:

extending the traces and the antenna through the display layer.

21. The method as defined in claim 18 further comprising:

imbedding the traces and the antenna in a first surface of the display layer; and providing a ground plane on a second surface of the display layer, opposite the first surface.

22. A computer system comprising:

a computer chassis;

a microprocessor mounted in the chassis;

a mass storage coupled to the microprocessor;

a video controller coupled to the microprocessor;

a display coupled to the chassis and including a non-conductive transparent display layer;

a cable extension formed of conductive material imbedded in the display layer; and an antenna formed of conductive material imbedded in the display layer and separated from the cable extension by the non-conductive display layer.

23. An information handling system comprising:

a computer chassis including a base and a top movably mounted on the base;

a cable connected to the chassis;

a microprocessor mounted in the chassis;

a mass storage coupled to the microprocessor;

a video controller coupled to the microprocessor;

a display coupled to the chassis, the display including a non-conductive transparent display layer and a channel formed therein;

a cable extension coupled to and extending from the cable, the cable extension formed of conductive material imbedded in the channel; and an antenna formed of conductive material imbedded in the channel and separated from the cable extension by the non-conductive display layer.

24. An antenna mounted in a portable computer comprising:

a chassis including a top movably mounted on a base of the portable computer;

a display coupled to the chassis and including a transparent non-conductive display layer having a channel formed therein;

a cable extension formed of conductive material imbedded in the channel; and the antenna formed of a conductive material imbedded in the channel and separate from the cable extension by the display layer.

* * * * *